(12) United States Patent
Kondash et al.

(10) Patent No.: US 8,985,180 B2
(45) Date of Patent: Mar. 24, 2015

(54) PARTITION SWEEP ASSEMBLY

(75) Inventors: Joseph D. Kondash, Wilkes-Barre, PA (US); Joseph L. Balay, Sugarloaf, PA (US)

(73) Assignee: CIW Enterprises, Inc., Mountaintop, PA (US)

( * ) Notice: Subject to any disclaimer, the term of this patent is extended or adjusted under 35 U.S.C. 154(b) by 635 days.

(21) Appl. No.: 12/958,829

(22) Filed: Dec. 2, 2010

(65) Prior Publication Data
US 2012/0138242 A1 Jun. 7, 2012

(51) Int. Cl.
*E05D 15/26* (2006.01)
*E05D 15/06* (2006.01)
*E05D 3/12* (2006.01)

(52) U.S. Cl.
CPC ............ *E05D 15/26* (2013.01); *E05D 15/0621* (2013.01); *E05D 3/12* (2013.01)
USPC ............................................ 160/199; 160/40

(58) Field of Classification Search
USPC ........ 160/206, 84.08, 84.09, 84.11, 118, 199, 160/40, 43; 52/718.04, 718.07; 49/483.1, 49/489.1, 490.1, 492.1, 500.1, 493.1
See application file for complete search history.

(56) References Cited

U.S. PATENT DOCUMENTS

| 2,892,496 | A | | 6/1959 | Stroup |
| 2,994,371 | A | | 8/1961 | Morseth et al. |
| 3,205,935 | A | | 9/1965 | Cayton |
| 3,380,506 | A | | 4/1968 | Good et al. |
| 3,590,541 | A | * | 7/1971 | Epstein et al. ............... 52/311.1 |
| 3,672,424 | A | | 6/1972 | Brown |
| 3,854,246 | A | | 12/1974 | McAllister |
| 3,955,330 | A | | 5/1976 | Wendt |
| 3,994,330 | A | | 11/1976 | Laby |
| 4,235,049 | A | | 11/1980 | Marinoni et al. |
| 4,357,979 | A | | 11/1982 | Marontate |
| 4,446,332 | A | | 5/1984 | Dauser, Jr. |
| 4,488,387 | A | * | 12/1984 | Foti ................................. 52/207 |
| 4,545,148 | A | | 10/1985 | Shaw |
| 4,922,987 | A | | 5/1990 | Marontate et al. |
| 5,067,294 | A | * | 11/1991 | McGowan ...................... 52/241 |
| 5,199,478 | A | | 4/1993 | Kubota |
| 5,237,776 | A | | 8/1993 | Kubota |
| 5,401,091 | A | | 3/1995 | Landry |
| 5,465,532 | A | | 11/1995 | Varin |
| 5,551,499 | A | * | 9/1996 | McRoberts ...................... 160/40 |
| 6,026,611 | A | | 2/2000 | Ralston et al. |
| 6,112,466 | A | * | 9/2000 | Smith et al. ..................... 49/306 |
| 6,253,493 | B1 | | 7/2001 | Sauve |
| 6,269,591 | B1 | | 8/2001 | Kelly |
| 6,332,294 | B1 | | 12/2001 | Carranza |
| 6,371,188 | B1 | * | 4/2002 | Baczuk et al. .................. 160/92 |
| 6,397,522 | B1 | | 6/2002 | Nussbaum |
| 6,907,641 | B1 | * | 6/2005 | Liles .................................. 16/97 |
| 7,003,916 | B2 | | 2/2006 | Nestell et al. |

(Continued)

*Primary Examiner* — David Purol
(74) *Attorney, Agent, or Firm* — Mitchell A. Smolow (57) ABSTRACT

A folding accordion sweep partition assembly is presented. The partition has a plurality of partition panels, the panel having a front face, a rear face, a bottom edge, and two opposing open sided panel keyway channels. A hinge having two side walls, the side wall terminating in a hinge key hinges two panels by having a first hinge key slidably received and retained in a first partition panel keyway channel and a second hinge key slidably received and retained in a second partition panel keyway channel. The partition panel has a mounting bracket affixed to it, a bottom bracket removably retained to the mounting bracket, and a sweep affixed to the mounting bracket.

16 Claims, 7 Drawing Sheets

(56) References Cited

U.S. PATENT DOCUMENTS

| | | |
|---|---|---|
| 7,062,881 B2 | 6/2006 | Rissone |
| 7,427,096 B2 | 9/2008 | Snider et al. |
| 8,100,164 B2 * | 1/2012 | Goodman et al. ............ 160/199 |
| 8,297,334 B2 | 10/2012 | Chu |
| 8,739,472 B2 | 6/2014 | Moss |
| 2007/0151179 A1 | 7/2007 | Speyer et al. |
| 2007/0175121 A1 | 8/2007 | Speyer et al. |
| 2007/0234657 A1 | 10/2007 | Speyer et al. |
| 2008/0105389 A1 * | 5/2008 | Goodman et al. ............ 160/203 |
| 2010/0257793 A1 * | 10/2010 | George et al. .................... 52/64 |
| 2011/0203746 A1 * | 8/2011 | Smart ........................... 160/194 |
| 2012/0055004 A1 * | 3/2012 | George et al. ................... 29/428 |
| 2012/0055638 A1 * | 3/2012 | George et al. .............. 160/196.1 |
| 2012/0138242 A1 * | 6/2012 | Kondash et al. ............. 160/202 |
| 2014/0190091 A1 | 7/2014 | George et al. |

* cited by examiner

PARTITION SWEEP ASSEMBLY

FIELD OF THE INVENTION

This invention relates generally to sliding doors and in particular, to a sweep assembly used with a side folding accordion partition.

BACKGROUND OF THE INVENTION

Side folding accordion partitions are used to provide space separation, often with the additional goal of providing one or more of security separation and sound control.

Panels which form the partition are hinged to one another and attached to ball bearing rollers which ride within a mounted overhead track. A lead panel is attached to a lead post which in turn is attached to a trolley having ball bearing rollers which also rides within the overhead track. Either a powered, or more commonly, a manually operated trolley provides the mechanical action required to open and close the partition.

When the partition is activated, the ball bearing rollers and lead post trolley roll in the overhead track causing the partition to traverse open or closed. The partition may or may not be slidably mounted to a floor channel. A partition slidably mounted to a floor channel ensures that the partition remains in the vertical thereby keeping the sweep at the bottom of the partition in contact with the floor. The floor channel provides lateral stability to the door curtain during travel towards or away from the closed position.

Certain applications require a contiguous floor surface, that is, unbroken by a floor channel. Examples include shop floors where a channel could interfere with rolling carts or emergency egress lanes where a floor channel could create a tripping hazard. In those situations, door assemblies that do not mount the partition to a floor channel are utilized.

Regardless of whether or not a floor channel is utilized, the sweep at the bottom of the partition is used to maintain a predetermined relationship to the floor, thereby, for example, helping to control sound.

Known designs for mounting the sweep to the partition leave an unfinished, sharp surface as further described below. Accordingly, there is still a continuing need for improved designs for mounting the sweep to a partition. The present invention fulfills this need by presenting a novel sweep assembly and further provides related advantages.

BRIEF SUMMARY OF THE INVENTION

The present invention provides a sweep assembly used in conjunction with a partition panel. The sweep assembly comprises a sweep affixed to a mounting bracket which is mounted to a partition panel. A bottom bracket fit to the partition panel and mounting bracket provides for a finished surface.

One advantage of the novel sweep assembly is the finished fit provides for a more attractive look.

A second advantage of the novel sweep assembly is the reduced chance for injury due to the absence of unfinished edges.

A third advantage is the ease in which field repairs can be made.

Other features and advantages of the present invention will be apparent from the following more detailed description of the preferred embodiments, taken in conjunction with the accompanying drawings which illustrate, by way of example, the principles of the invention.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

Other features and advantages of the present invention will be apparent from the following more detailed description of the preferred embodiments, taken in conjunction with the accompanying drawings which illustrate, by way of example, the principles of the invention.

DETAILED DESCRIPTION OF THE INVENTION

As required, a detailed embodiment of the present invention is disclosed; however, it is to be understood that the disclosed embodiment is merely exemplary of the invention that may be embodied in various forms. The figures are not necessary to scale, and some features may be exaggerated to show details of particular components. Therefore, specific structural and functional details disclosed are not to be interpreted as limiting, but merely as a basis for the claims and as a representative basis for teaching one skilled in the art to variously employ the present invention. Where possible, like reference numerals have been used to refer to like parts in the several alternative embodiments of the present invention described herein.

Referring to FIGS. 1 to 5, a known sweep assembly is described to better appreciate the novel features of the invention. Mounting bracket PA-4 is fixed to partition panel PA-6 with rivet PA-8 during the partition panel manufacturing process. Panel PA-6 comprises two open sided panel key way channels PA-10 each of which receives a hinge PA-12. Hinge PA-12 is manufactured from a flexible material having two side walls each terminating in a key PA-14 to be slidably received and retained in a panel keyway channel PA-10, thereby hinging two partition panels PA-6 together.

Figure 1:
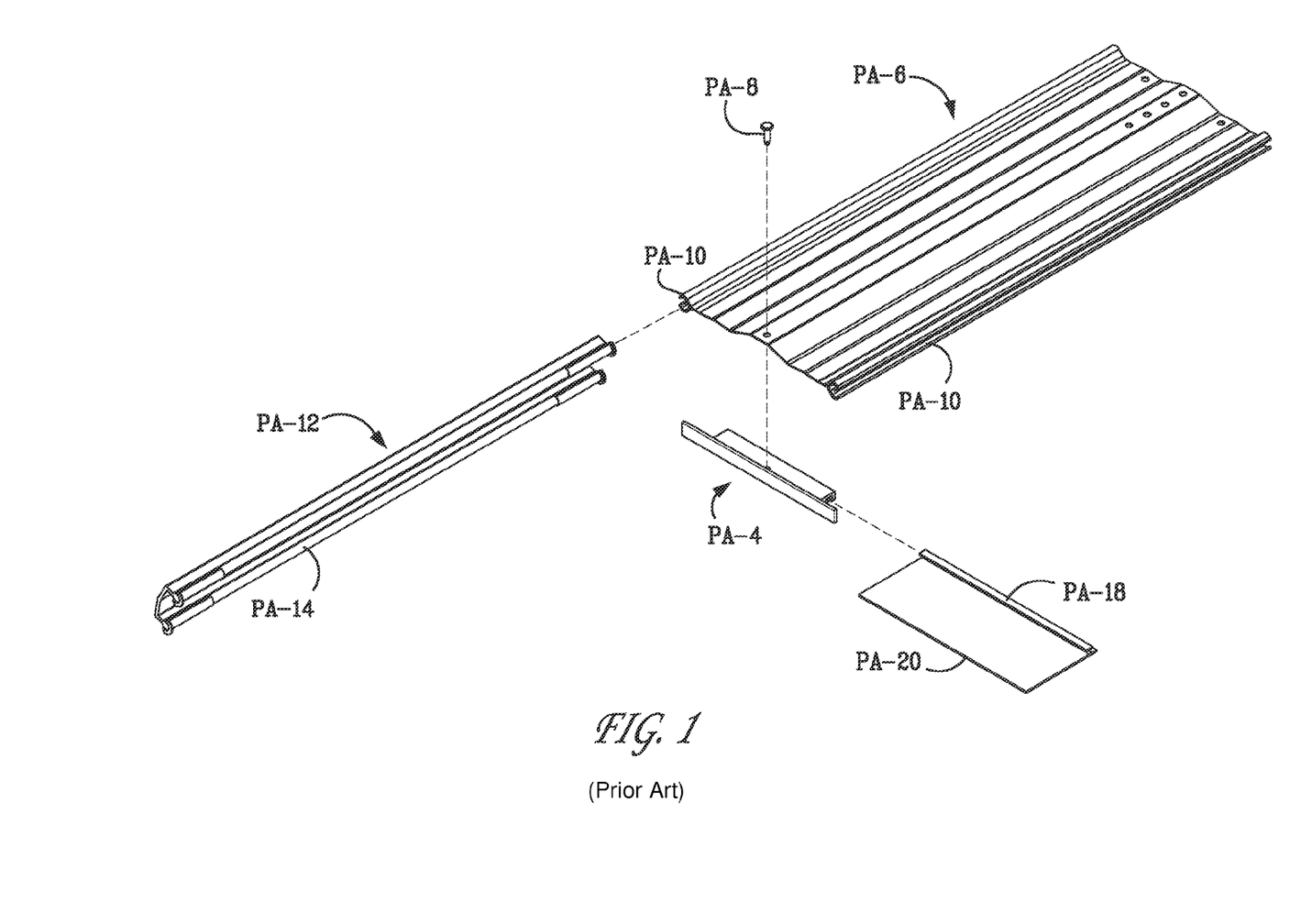
FIG. 1 is an exploded isometric view of a known partition panel, partition hinge, mounting bracket, and sweep prior to assembly.
Figure 2:
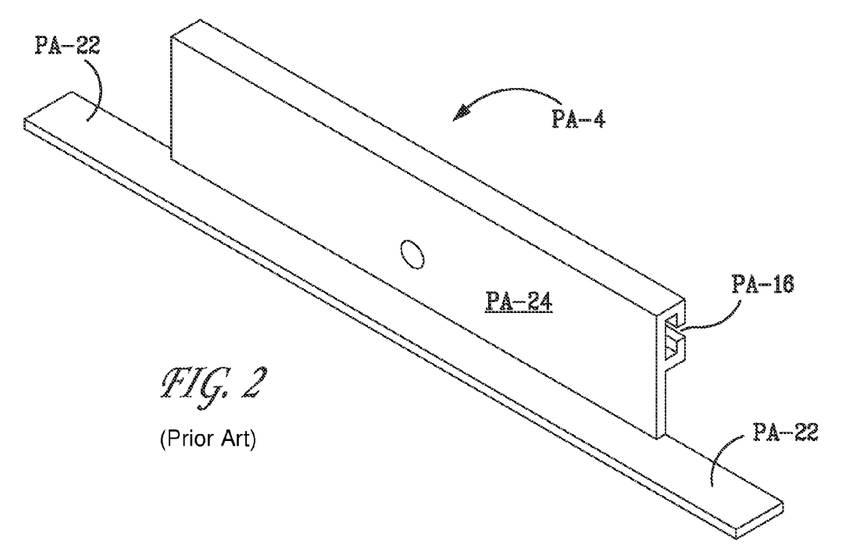
FIG. 2 is an isometric view of the mounting bracket of FIG. 1.
Figure 3:
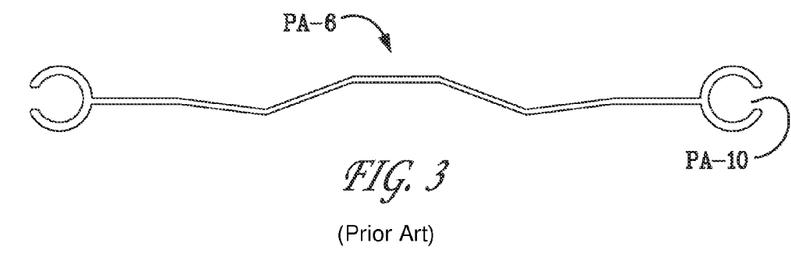
FIG. 3 is an end view of the partition panel of FIG. 1.
Figure 4:
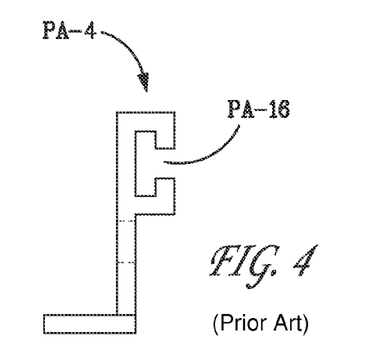
FIG. 4 is an end view of the mounting bracket of FIG. 1 prior to hinge placement.
Figure 5:
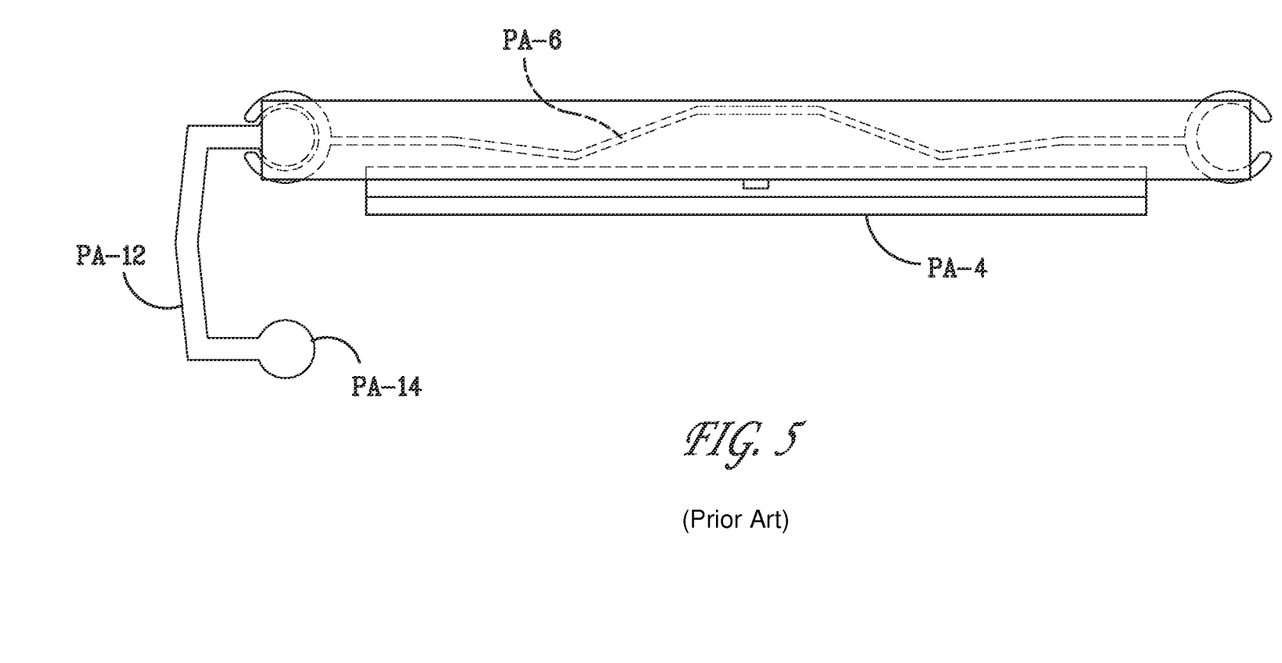
FIG. 5 is and end view of the hinge and mounting bracket of FIG. 1 after hinge placement.

Mounting bracket PA-4 comprises two wings PA-22 extending from the mounting bracket main body PA-24, and a mounting bracket keyway channel PA-16 on its front side to slidably receive a sweep key PA-18 located on the rear side of sweep PA-20.

A plurality of partition panels PA-6 and hinges PA-12 are assembled during the manufacturing process and shipped pre-assembled for additional modification during installation. A plurality of pre-assembled partitions are then hinged together in the field to create a finished partition of required width to fit an opening (not shown). When field assembling the pre-assembled partitions, mounting bracket wings PA-22 must be broken off to expose the panel keyway channel PA-10 in order to slide hinge PA-12 into panel keyway channel PA-10. Once the wings have been broken off, there remains a sharp unfinished mounting bracket edge. This sharp, unfinished edge may present a safety hazard as well as being unsightly.

Turning now to FIGS. 6-10 representing a preferred embodiment of the present invention, mounting bracket 4 comprises a mounting bracket keyway channel 16 on a first side and a rivet receiving orifice 26. Optionally, a rivet orifice protrusion 28 extends from the mounting bracket second side a distance sufficient to contact the partition panel 6 when partition panel 6 is not a flat panel. A mounting bracket bottom edge 30 is in contact with the bottom edge of the partition panel 6 and prevents the rotation of mounting bracket 4 around rivet 8, used to attach the mounting bracket 4 to the partition panel 6. The mounting bracket bottom edge 30 is received by a bottom bracket 40, described in detail below.

Figure 13:
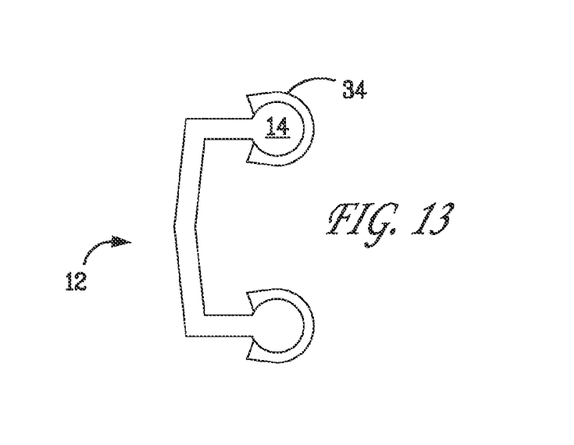
FIG. 13 is an end view of the hinge of FIG. 6.

The partition panel 6 (FIG. 6) is of known design, comprising a rivet receiving orifice 32 and two open sided panel keyway channels 10, each for receiving a hinge 12. Hinge 12 (FIG. 13) is of known design, for example, manufactured from a flexible material having two side walls, each side wall terminating in a hinge key 14 which is slidably received and retained in a partition panel keyway channel 10 of a first and second partition panel, thereby hinging the two partition panels 6 together. An optional flanged hinge stop 34 is fixed to the bottom end of each hinge side wall key 14, for example by crimping, to prevent the hinge 12 from slidably displacing upward.

Figure 14:
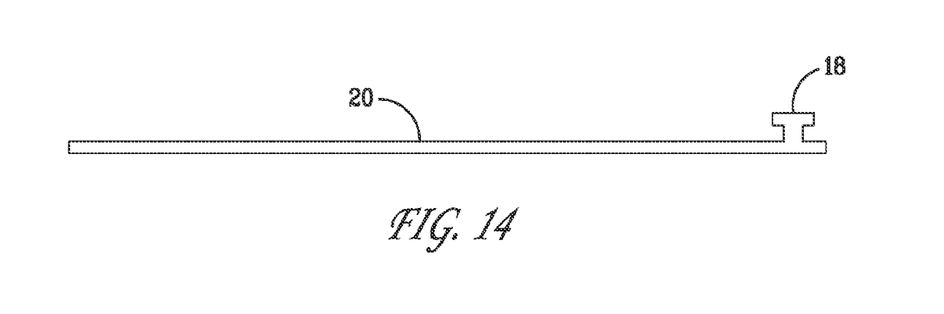
FIG. 14 is an end view of the sweep of FIG. 6.
Figure 15:
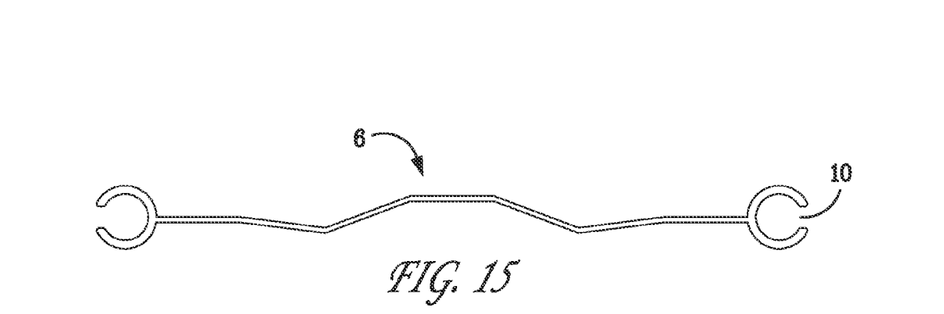
FIG. 15 is an end view of the partition panel of FIG. 6.

The sweep 20 (FIG. 14) is of known design, comprising a flexible material having a sweep key 18 on a first side to be slidably received by the mounting bracket keyway channel 16.

Figure 12:
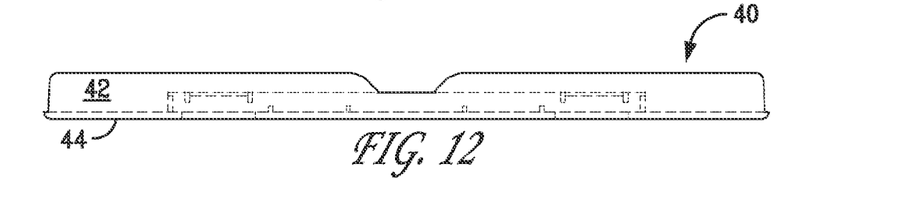
FIG. 12 is a front view of the bottom bracket of FIG. 6.

The bottom bracket 40 (FIGS. 10-12) comprises a front side 42 and a bottom 44. The inner side 46 of bottom 44 is manufactured to removably receive and retain mounting bracket bottom edge 30, for example, by snap fit. The bottom bracket 40 is of predetermined width and shape to cover the end of both of the partition panel keyway channels 10 and to have the front side 42 extend upward onto the panel front face.

Figure 6:
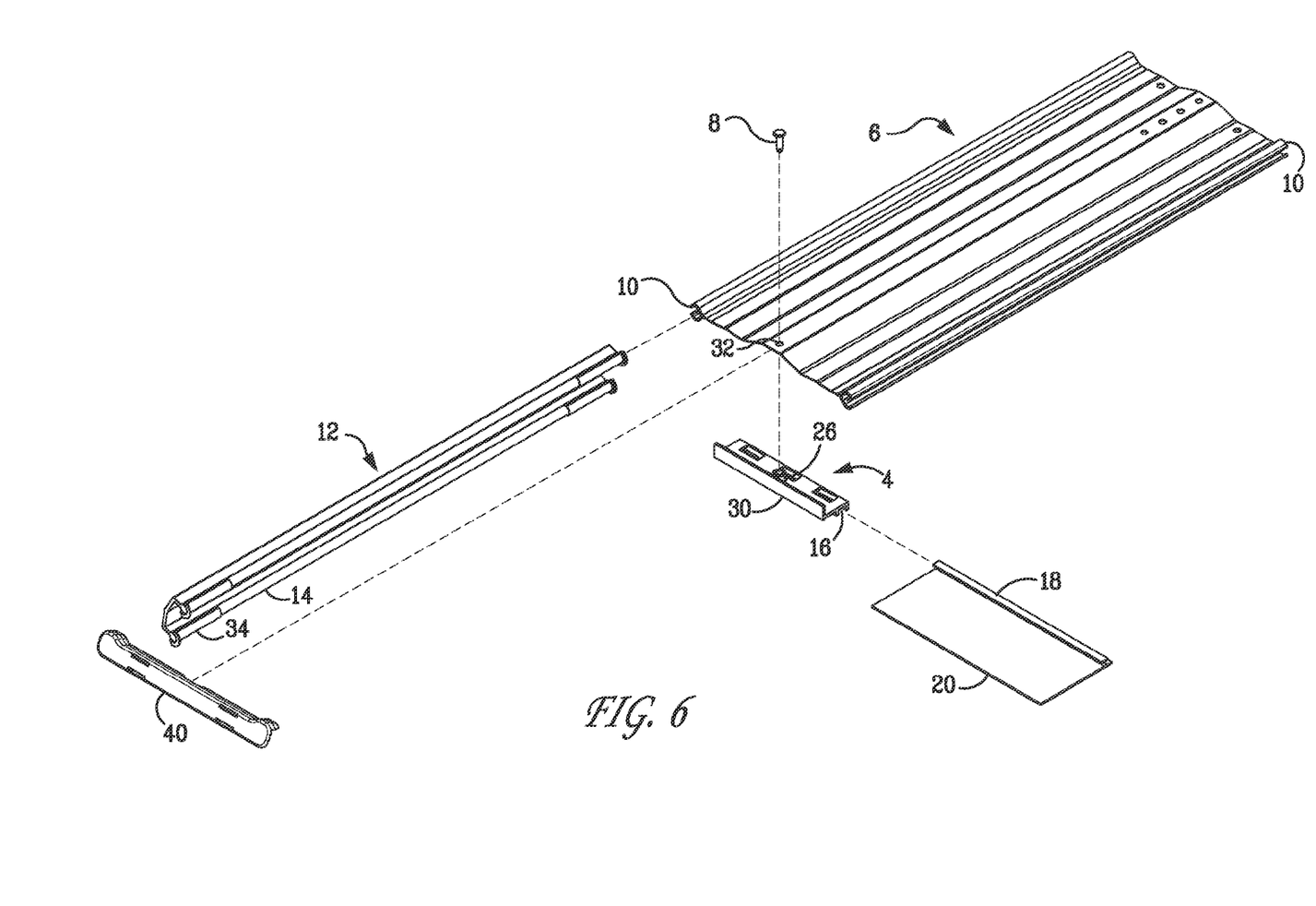
FIG. 6 is an exploded isometric view of the partition panel, partition hinge, mounting bracket, bottom bracket and sweep of one embodiment of the present invention.
Figure 7:
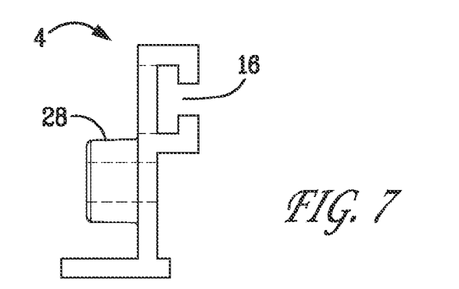
FIG. 7 is an end view of the mounting bracket of FIG. 6.
Figure 8:
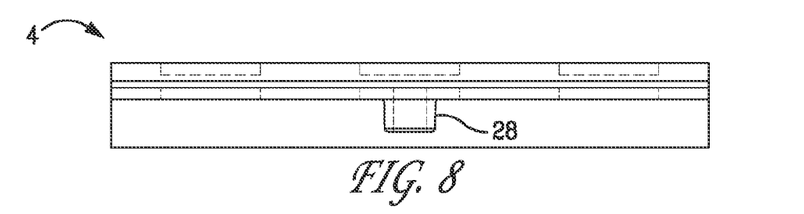
FIG. 8 is a top view of the mounting bracket of FIG. 6.
Figure 9:
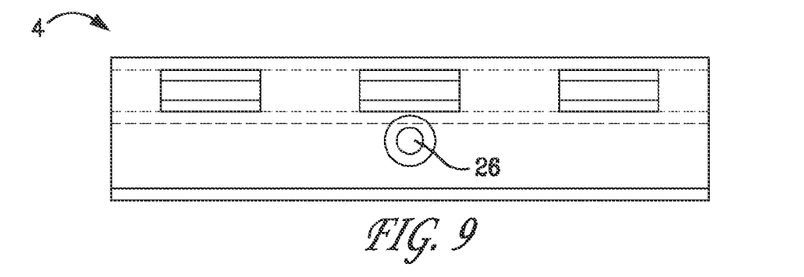
FIG. 9 is a front view of the mounting bracket of FIG. 6.
Figures 10, 11:
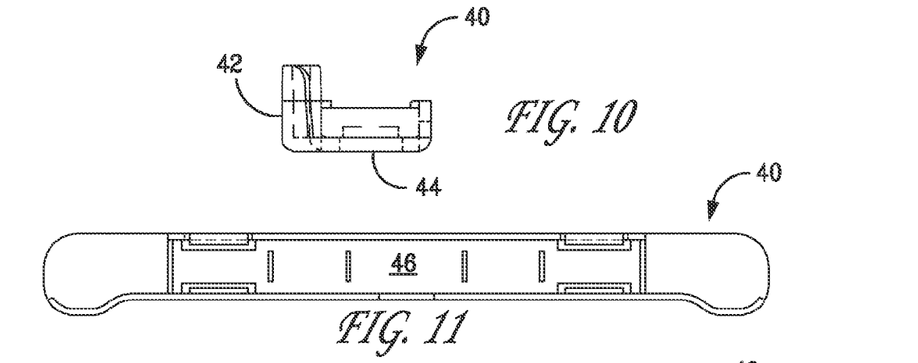
FIG. 10 is an end view of the bottom bracket of FIG. 6.
FIG. 11 is a top view of the bottom bracket of FIG. 6.
Figure 16:
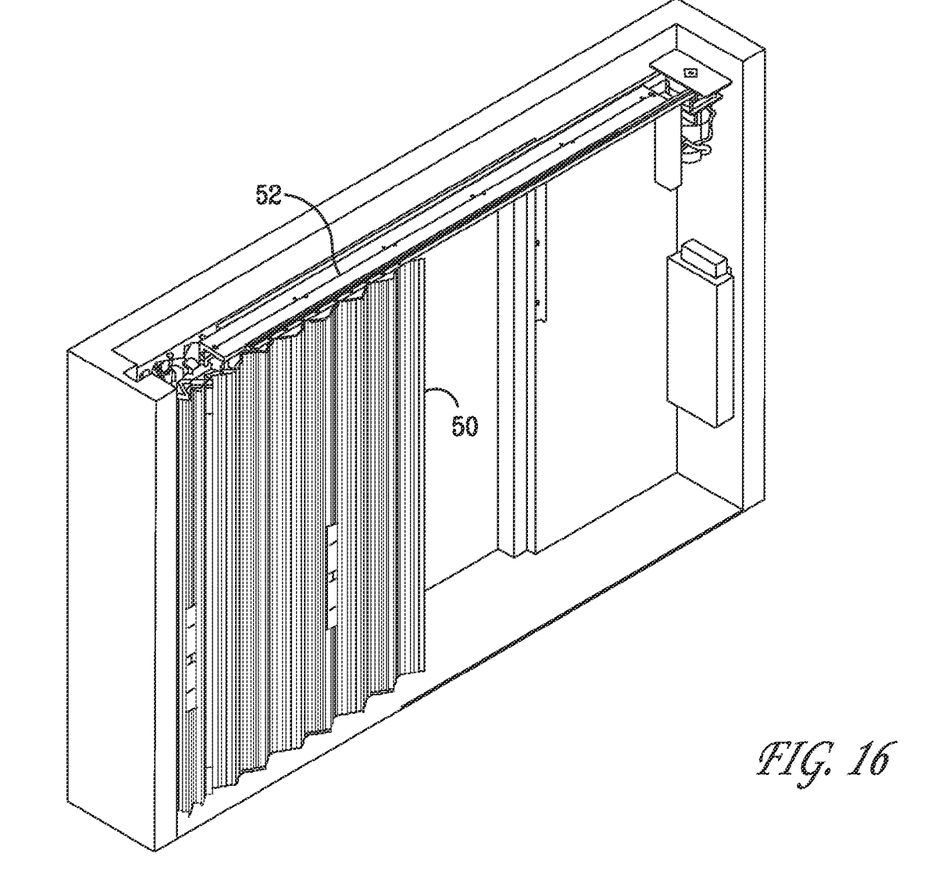
FIG. 16 is a perspective view of a partition comprising the panels and sweep assembly of FIG. 6 spanning an opening.

The mounting bracket 4 is attached to the partition panel 6 by a rivet 8. The mounting bracket bottom edge 30 is in contact with the bottom edge of the partition panel 6, thereby preventing rotation of the mounting bracket around the rivet 8. The mounting bracket 4 does not cover panel keyway channels 10. Therefore, mounting bracket 4 does not require field modification to allow hinge 12 to be slidably inserted into panel keyway channel 10 as the partition 50 (either individually or as factory pre-assembled partition sections) (FIG. 16) is being field assembled. Once hinges 12 have been inserted into the partition panel 6, bottom bracket 40 is snap fit onto mounting bracket bottom edge 30, thereby providing finished edges that completely span the face of the partition panel 6 and cover the partition panel channel 10 openings. The snap fit allows for easy and convenient field replacement or repair of hinge 12 or partition panel 6.

Following assembly of the number of partition panels (either individually or as factory pre-assembled partition panels) needed to form a partition 50 of required width to span an opening (FIG. 16), the sweep 20 is attached to the partition 50 by slidably inserting the sweep key 18 into each mounting bracket keyway channel 16. The partition panels are operatively engaged in an overhead track 52 mounted to the span opening in known fashion. Such operative engagement is well known and need not be described in detail.

Although the present invention has been described in connection with specific examples and embodiments, those skilled in the art will recognize that the present invention is capable of other variations and modifications within its scope. The example and embodiment is intended as typical of, rather than in any way limiting on, the scope of the present invention as presented in the appended claims.

What is claimed is:

1. A folding accordion partition comprising:
    a plurality of partition panels, each panel comprising a front face, an opposing rear face, a bottom edge, and two opposing open sided panel keyway channels;
    a hinge comprising two side walls, each side wall terminating in a hinge key, a first hinge key slidably received and retained in a first partition keyway channel and a second hinge key slidably received and retained in a second partition panel keyway channel, thereby hinging the two partition panels;
    a partition panel having a mounting bracket affixed to it;
    a bottom bracket removably retained to the mounting bracket; and
    a sweep affixed to the mounting bracket;
    wherein each mounting bracket comprises a bottom edge and a keyway channel on a first side; and the bottom bracket is snap fit to the mounting bracket bottom edge and covers a panel keyway channel end, the bottom bracket further comprising a front side extending upward onto the panel front face.

2. The partition of claim 1 wherein the mounting bracket further comprises a rivet orifice protrusion protruding from a second side to contact each partition.

3. The partition of claim 1 wherein the sweep comprises a sweep key on a first side to removably engage the mounting bracket keyway channel.

4. The partition of claim 1 wherein the affixed mounting bracket does not cover the two open sided panel keyway channels and the bottom bracket does.

5. The partition of claim 2 wherein the mounting bracket is affixed to the partition panel with a rivet and the mounting bracket bottom edge is in contact with the partition panel bottom edge, thereby preventing mounting bracket rotation.

6. The partition of claim 1 wherein the hinge further comprises a stop affixed to the hinge to prevent upward hinge displacement.

7. A method for forming a sweep partition comprising the steps of:
    affixing a mounting bracket to a plurality of panels, the panel comprising a front face, a rear face, a bottom edge, and two open sided panel keyway channels;
    affixing a hinge to two panels, the hinge comprising two side walls, each side wall terminating in a hinge key, a first hinge key slidably received and retained in a partition panel keyway channel of a first partition panel and a second hinge key slidably received and retained in a partition panel keyway channel of a second partition panel, thereby hinging the two partition panels;

removably affixing a bottom bracket to the mounting bracket; and affixing a sweep to the mounting bracket wherein each mounting bracket comprises a bottom edge and a keyway channel on a first side; and the bottom bracket is snap fit to the mounting bracket bottom edge and covers a panel keyway channel end, the bottom bracket further comprising a front side extending upward onto the panel front face.

8. The method of claim 7 wherein the mounting bracket further comprises a rivet orifice protrusion protruding from a second side to contact each partition.

9. The method of claim 7 wherein the sweep comprises a sweep key on a first sweep side to removably engage the mounting bracket keyway channel.

10. The method of claim 7 wherein the affixed mounting bracket does not cover the two open sided panel keyway channels and the bottom bracket does.

11. The method of claim 8 wherein the mounting bracket is affixed to the partition panel with a rivet and the mounting bracket bottom edge is in contact with the partition panel bottom edge thereby preventing mounting bracket rotation.

12. A folding accordion partition comprising:

a plurality of partition panels, each panel comprising a front face, an opposing rear face, a bottom edge, and two opposing open sided panel keyway channels;

a hinge comprising two side walls, each side wall terminating in a hinge key, a first hinge key slidably received and retained in a first partition panel keyway channel and a second hinge key slidably received and retained in a second partition panel keyway channel, thereby hinging the two partition panels;

a partition panel having a mounting bracket affixed to it, the mounting bracket comprising a rivet orifice protrusion protruding from a second side contacting the partition;

a bottom bracket removably retained to the mounting bracket; and a sweep affixed to the mounting bracket;

wherein each mounting bracket comprises a bottom edge and a keyway channel on a first side and the bottom bracket is snap fit to the mounting bracket bottom edge and covers the panel keyway channel end, the bottom bracket further comprising a front side extending upward onto the panel front face.

13. The partition of claim 12 wherein the sweep comprises a sweep key on a first sweep side to removably engage the mounting bracket keyway channel.

14. The partition of claim 12 wherein the affixed mounting bracket does not cover the two open sided panel keyway channels and the bottom bracket does.

15. The partition of claim 12 wherein the mounting bracket is affixed to the partition panel with a rivet and the mounting bracket bottom edge is in contact with the partition panel bottom edge, thereby preventing mounting bracket rotation.

16. The partition of claim 12 wherein the hinge further comprises a stop affixed to the hinge to prevent upward hinge displacement.

\* \* \* \* \*